United States Patent
Kim et al.

(10) Patent No.: US 7,348,992 B2
(45) Date of Patent: Mar. 25, 2008

(54) APPARATUS FOR AND METHOD OF COLOR COMPENSATION

(75) Inventors: Moon-cheol Kim, Yongin (KR); Jae-hwan Oh, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 699 days.

(21) Appl. No.: 10/622,647

(22) Filed: Jul. 21, 2003

(65) Prior Publication Data

US 2004/0017380 A1 Jan. 29, 2004

(30) Foreign Application Priority Data

Jul. 26, 2002 (KR) ............................... 2002-44353

(51) Int. Cl.

| | |
|---|---|
| *H04N 1/46* | (2006.01) |
| *H04N 9/475* | (2006.01) |
| *H04N 9/64* | (2006.01) |
| *G09G 5/02* | (2006.01) |
| *G09G 5/00* | (2006.01) |
| *G03F 3/08* | (2006.01) |
| *G06K 9/00* | (2006.01) |
| *G06K 9/40* | (2006.01) |
| *G06K 9/32* | (2006.01) |
| *H04N 9/74* | (2006.01) |
| *H04N 9/57* | (2006.01) |

(52) U.S. Cl. ...................... 345/589; 345/591; 345/600; 345/606; 348/518; 348/582; 348/587; 348/649; 358/516; 358/518; 358/520; 358/525; 382/162; 382/167; 382/254; 382/274

(58) Field of Classification Search ............... 345/428, 345/589–594, 597, 600, 690, 698, 606, 643; 382/162–167, 218, 172, 254, 300, 274–276; 358/515–520, 525; 348/497–499, 514–520, 348/557–599, 603–616, 630–649, 703, 717

See application file for complete search history.

(56) References Cited

U.S. PATENT DOCUMENTS 4,695,875 A * 9/1987 Kishi ........................ 348/653

(Continued)

FOREIGN PATENT DOCUMENTS

JP 02-096477 4/1990

(Continued)

OTHER PUBLICATIONS

Japanese Office Action.

(Continued)

*Primary Examiner*—Wesner Sajous
(74) *Attorney, Agent, or Firm*—Staas & Halsey LLP

(57) ABSTRACT

An apparatus for color compensation includes a chroma deflection generation unit to calculate a chroma deflection based on an input chroma signal and a predetermined first reference value, a hue deflection generation unit to calculate a hue deflection based on an input hue signal and a predetermined second reference value, a chroma deflection function generation unit to calculate a luminance deflection based on an input luminance signal and a predetermined third value, and a tone mapping function generation unit to output the chroma signal, hue signal and luminance signal after individually compensating these signals based on the chroma deflection, hue deflection and luminance deflection. According to the present invention, when color is distorted due to transmission flaws, the color can be compensated to be an appropriate color.

42 Claims, 3 Drawing Sheets

U.S. PATENT DOCUMENTS

| | | | |
|---|---|---|---|
| 5,028,991 A * | 7/1991 | Sekizawa et al. | 358/537 |
| 5,130,935 A | 7/1992 | Takiguchi et al. | |
| 5,333,070 A * | 7/1994 | Ichikawa | 358/518 |
| 5,384,601 A | 1/1995 | Yamashita et al. | |
| 5,450,216 A * | 9/1995 | Kasson | 358/518 |
| 6,262,817 B1 * | 7/2001 | Sato et al. | 358/518 |
| 7,012,617 B2 * | 3/2006 | Luo et al. | 345/593 |
| 2001/0005222 A1 | 6/2001 | Yoshihiro | |
| 2001/0035989 A1 | 11/2001 | Takemoto | |

FOREIGN PATENT DOCUMENTS

| | | |
|---|---|---|
| JP | 04-167866 | 6/1992 |
| JP | 2001-126060 | 5/2001 |
| JP | 2002-016818 | 1/2002 |

OTHER PUBLICATIONS

Integrated Circuits, Data Sheet, "TDA9178 YUV one chip picture improvement based on luminance vector-, colour vector- and spectral processor", Sep. 24, 1999.
European Search Report dated Mar. 9, 2005.
Chinese Office Action for Chinese Application No. 03147579.5.
CITATION 3, dated Feb. 25, 2000, pp. 172-174.
Korean Office Action for 2003-280226.
Japanese Office Action for Application No. 2003-280226; dated Sep. 19, 2006.

* cited by examiner

APPARATUS FOR AND METHOD OF COLOR COMPENSATION

CROSS-REFERENCE TO RELATED APPLICATION

This application claims the benefit of Korean Application No. 2002-44353, filed Jul. 26, 2002 in the Korean Intellectual Property Office, the disclosure of which is incorporated herein by reference.

BACKGROUND OF THE INVENTION

1. Field of the Invention

The present invention relates to an apparatus for and a method of color compensation, and more particularly, to an apparatus for and a method of color compensation capable of color-compensating to a desired color when an expressed color is distorted when displayed on a displaying apparatus.

2. Description of the Prior Art

Oftentimes, color represented on a displaying apparatus is distorted during an image signal transmission or by the influence of external light used for camera photography. Especially when the color that is distorted is visually sensitive, such as the color of human skin (skin tone), the color needs to be compensated.

An apparatus for and a method of color compensation generally compensate for an input color to be as close as an original color in the event of color distortion. FIG. 1 is a view showing one example of a conventional method of color compensation, especially a method of compensating the skin tone. Referring to FIG. 1, a color preference axis A is set up. The color preference axis A is the reference used to compensate the skin tone, is set up. In FIG. 1, the preference axis A is shown in a YUV color space. After setting up the preference axis A, mapping is performed in order to have color value of the preference axis A by moving color existing in a certain area (area with slant lines in FIG. 1) adjacent to the preference axis A to the preference axis A. As shown, the preference axis A has an angle of either 123° or 117°. An example of this method is used by a TDA9178 chip manufactured by Philips Semiconductor.

Another compensation method is to detect the area of the skin tone in an entire image first, and skip the color enhancement for the detected area. However, the above apparatus for and method of color compensation has a problem in that the result of the color compensation is visually unsatisfactory as it moves the color of a certain area to a color value of a set up preference axis A without considering a preference of people or which does not perform color enhancement with respect to a certain area such as the skin tone. Moreover, as the method only compensates for hue, it is not possible to properly compensate for a distortion of the chroma or luminance of the color.

SUMMARY OF THE INVENTION

It is an aspect of the present invention to provide an apparatus for and a method of color compensation capable of compensating chroma, hue and luminance based on a color preference of people when color displayed on a displaying apparatus is distorted.

Additional aspects and/or advantages of the invention will be set forth in part in the description which follows and, in part, will be obvious from the description, or may be learned by practice of the invention.

The above and/or other aspects of the present invention can be realized by providing an apparatus for color compensation according to an aspect of the invention which includes a chroma deflection generation unit to calculate a chroma deflection based on an input chroma signal and a predetermined first reference value, a hue deflection generation unit to calculate a hue deflection based on an input hue signal and a predetermined second reference value, a luminance deflection generation unit to calculate a luminance deflection based on an input luminance signal and a predetermined third value, and a skin tone mapping function generation unit to output a corrected chroma signal, a corrected hue signal, and a corrected luminance signal after individually compensating the input chroma, hue, and luminance signals based on the calculated chroma deflection, the calculated hue deflection and the calculated luminance deflection.

It is preferable, but not required, that the apparatus further comprises a color space conversion unit to convert a color signal of an input image in color space so as to calculate the input chroma signal, the input hue signal, and the input luminance, and to transmit the calculated chroma, hue, and luminance signals to the chroma deflection generation unit, the hue deflection generation unit and luminance deflection unit.

It is advisable, but not required, that the first, second and third reference values are provided based on empirical data collected after statistically processing data obtained through experiment.

It is recommended, but not required, that the chroma deflection is calculated based on a difference between the input chroma signal and the first reference value, and the skin tone mapping function unit outputs the corrected chroma signal compensated by summing the input chroma signal and the chroma deflection.

It is preferable, but not required, that the hue deflection is calculated based on a difference between the input hue signal and the second reference value, and the skin tone mapping function unit outputs the corrected chroma signal compensated by summing the input hue signal and the hue deflection.

Moreover, it is advisable, but not required, that the luminance deflection is calculated based on a difference between the input luminance signal and the third reference value, and the skin tone mapping function unit outputs the corrected luminance signal compensated after summing the input luminance signal and the luminance deflection.

According to another aspect of the invention, a method of color compensation comprises calculating a chroma deflection based on an input chroma signal and a predetermined first reference value, calculating a hue deflection based on an input hue signal and a predetermined second reference value, calculating a luminance deflection based on an input luminance signal and a predetermined third reference value; and outputting a compensated chroma signal, a compensated hue signal, and a compensated luminance signal resulting after individually compensating the input chroma, hue, and luminance signals based on the chroma deflection, the hue deflection and the luminance deflection.

It is advisable, but not required, that the method further comprises converting a color signal of an input signal in color space to calculate the chroma signal, the hue signal, and the luminance signal, and individually transmitting the calculated chroma, hue, and luminance signals as the input signals for use in the calculating the chroma deflection, hue deflection, and the luminance deflection.

It is preferable, but not required, that the first, second and third reference values are provided based on empirical data collected after statistically processing data obtained through experiment.

It is advisable, but not required, that the chroma deflection is calculated based on a difference between the chroma signal and the first reference value, and the outputting the compensated chroma signal, hue signal, and the luminance signal the comprises summing the input chroma signal and the chroma deflection to output the compensated chroma signal.

It is recommended, but not required, that the hue deflection is calculated based on a difference between the input hue signal and the second reference value, and the outputting the compensated chroma signal, the hue signal, and the luminance signal comprises summing the input hue signal and the hue deflection to output the compensated hue signal.

It is preferable, but not required, that the luminance deflection is calculated based on a difference between the input luminance signal and the third reference value, and the outputting the compensated chroma signal, the hue signal, and the luminance signal comprises summing the input luminance signal and the luminance deflection to output the compensated luminance signal.

BRIEF DESCRIPTION OF THE DRAWINGS

The above and/or other aspects and features of the present invention will be more apparent and more readily appreciated by describing the embodiments of the present invention by referring to the accompanying drawings, in which.

DETAILED DESCRIPTION OF THE EMBODIMENTS

Figure 1:
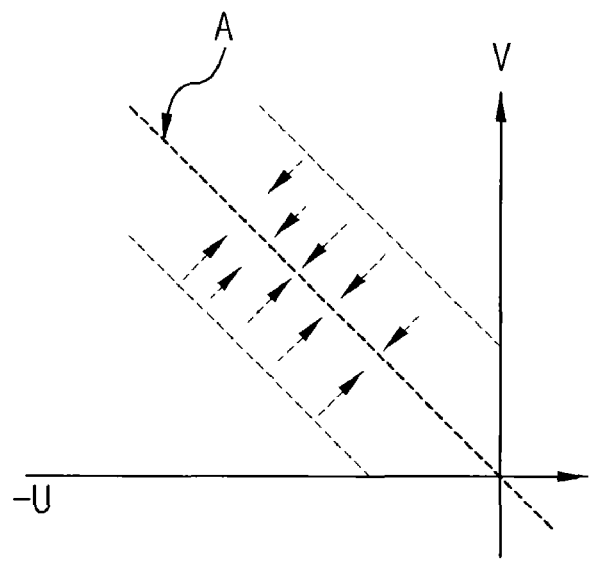
FIG. 1 shows a conventional method of color compensation.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
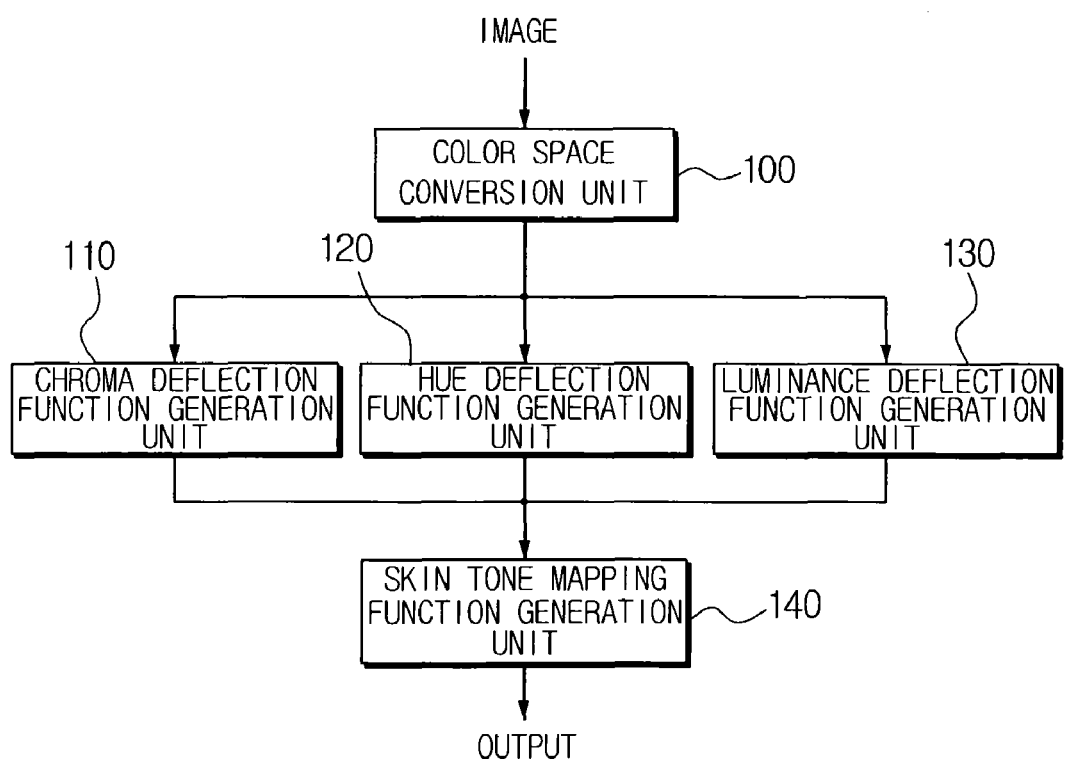
FIG. 2 is a block diagram showing an apparatus for color compensation according to an embodiment of the present invention.

FIG. 2 is a block diagram showing an apparatus for color compensation according to an embodiment of the present invention and which is capable of compensating the skin tone. Referring to FIG. 2, the apparatus includes a color space conversion unit 100, a chroma deflection function generation unit 110, a hue deflection function generation unit 120, a luminance deflection function generation unit 130, and a skin tone mapping function generation unit 140. The color space conversion unit 100 converts a color signal of an input image and outputs a hue signal, a chroma signal, and a luminance signal. The chroma deflection function generation unit 110 calculates a chroma deflection. The hue deflection function generation unit 120 calculates a hue deflection. In addition, the luminance deflection function generation unit 130 generates a luminance deflection. The skin tone mapping function generation unit 140 compensates the original chroma signal, the hue signal, and the luminance signal based on the calculated chroma deflection, hue deflection and luminance deflection.

Figure 3:
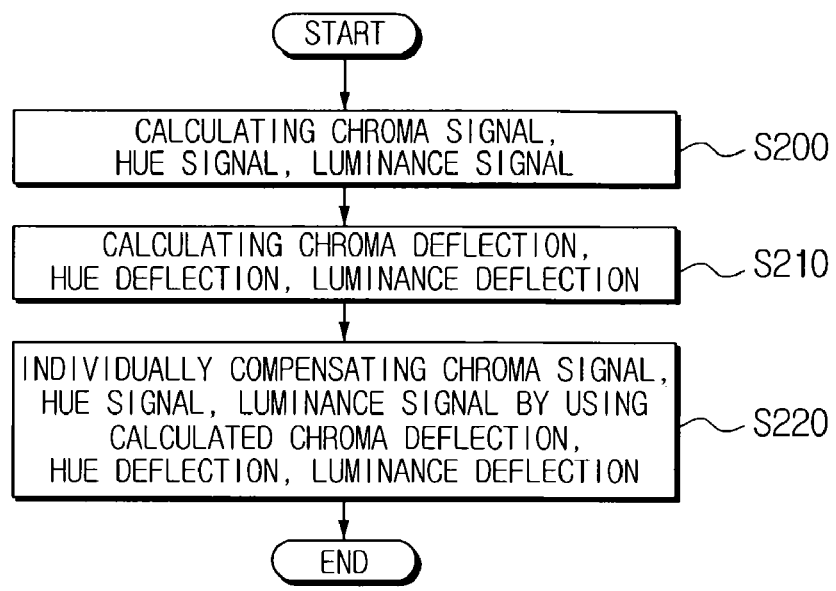
FIG. 3 is a flow chart showing an embodiment of an operation method of the apparatus for color compensation of FIG. 2.

FIG. 3 is a flow chart showing the operation method of the apparatus for color compensation of FIG. 2. Referring to FIG. 3, the color space conversion unit 100 calculates the original chroma signal, the original hue signal and the original luminance signal from the color signal of the input image (S200). The color signal of the input image can have various color spaces such as RGB, YIQ, YUV, YCbCr and HLS in accordance with the environment. These color signals are converted into the original chroma signal, the original hue signal and the original luminance signal by using appropriate mathematical expressions.

The original chroma signal, the original hue signal and the original luminance signal calculated at the color space conversion unit 100 are individually transmitted to the chroma deflection function generation unit 110, the hue deflection function generation unit 120, and the luminance deflection function generation unit 130. The chroma deflection function generation unit 110 calculates the chroma deflection based on the transmitted chroma signal and a first reference value. The hue deflection function generation unit 120 calculates the hue deflection based on the transmitted hue signal and a second reference value. The luminance deflection function generation unit 130 calculates the luminance deflection based on the transmitted luminance signal and a third reference value (S210).

According to an embodiment of the invention, the first, second and third reference values used for calculating the chroma deflection, the hue deflection, and the luminance deflection are decided by the following method. In the case of the skin tone, the skin tone is classified in accordance with race. The chroma, the hue and the luminance are changed with respect to the skin tone for each race. The skin tone most preferred by a person is determined using experimental data. For the objective result of the experiment, the experiment should be operated under the same environment and condition. Through these experiments, data on the chroma, hue and luminance preferred by people can be achieved, accounting for factors such as race.

Table 1 is experimental data according to a Calibrated CRT-Display and an sRGBd viewing condition of an ITU-R (ITU Radio communication Sector) BT709 YcbCr Coding.

TABLE 1

|  | Y | Cb | Cr | C | H |
| --- | --- | --- | --- | --- | --- |
| Ideal skin color | 0.38~0.7 | −0.12~0.05 | 0.05~0.1 | 0.078~0.153 | 123°~152° |
| Color skin of real image | 0.2~0.95 | −0.2~0 | 0.03~0.22 | 0~0.3 | 90°~165° |
| Area of preferred color skin | 0.35~0.64 | −0.12~−0.03 | 0.07~0.14 | 0.1~0.7 | 100°~138° |
| Average (m) | 0.51 | −0.074 | 0.098 | 0.124 | 126° |
| Average deflection | ±0.082 | ±0.021 | ±0.0128 | ±0.0185 | ±8° |
| Statistical range(±δ) | 0.427~0.592 | −0.095~−0.053 | 0.0856~0.11 | 0.105~0.143 | 118°~134° |
| Statistical range (±2δ) | 0.35~0.673 | −0.116~−0.032 | 0.073~0.124 | 0.088~0.16 | 110°~142° |

Referring to Table 1, the skin tone that is preferred by people is almost the same with the ideal skin tone. However, when the preferred skin tone is compared with the statistical range using 2δ, the chroma is increased by 0.01, and the hue is moved by 10° in the direction of red.

Figure 4:
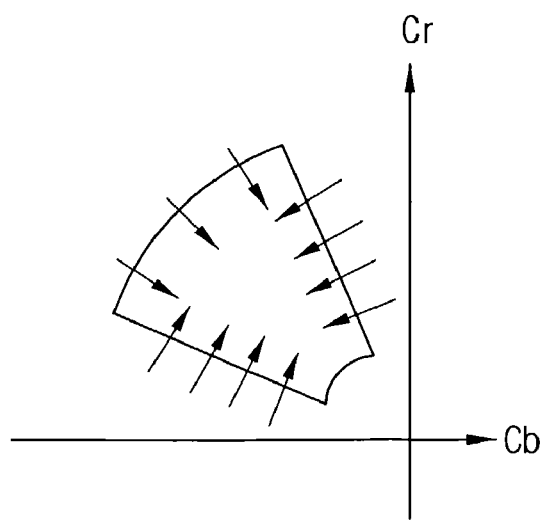
FIGS. 4 and 5 are views showing the area of the skin tone preferred by people expressed in a YCbCr color space.
Figure 5:
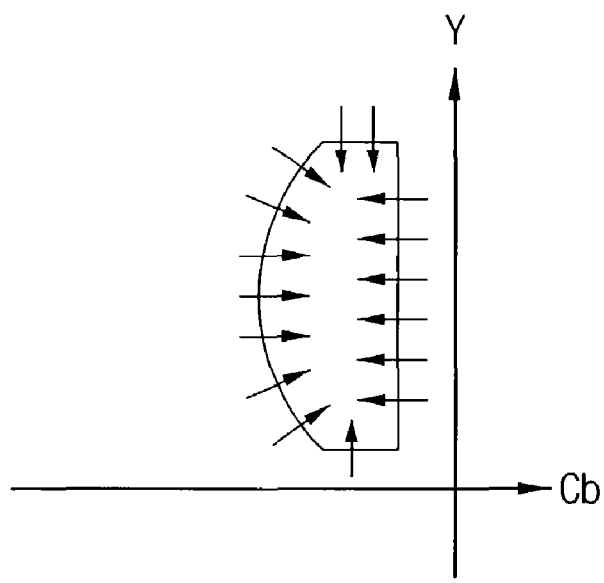

FIGS. 4 and 5 are views showing the area of skin tone preferred by people based on Table 1, which is expressed in a YCbCr color space. FIG. 4 shows the area on an Cb-Cr plane, and FIG. 5 shows the area on a Y-Cb plane. For reference, the CbCr color space can be expressed as a YCH color space as a polar coordinate such as using the following mathematical expression 1.

$$C = \sqrt{Cb^2 + Cr^2}$$
$$H = \tan^{-1}\frac{Cb}{Cr}$$

Mathematical Expression 1

Therefore, when the values of Y, Cb, Cr, C and H are as given in Table 1, areas of FIG. 4 or FIG. 5 can be drawn. In FIGS. 4 and 5, the arrow adjacent to the area shows mapping of the values around the area into the area. In other words, the color can be compensated by mapping the color around the area of the skin tone preferred by people into the area.

Figure 6:
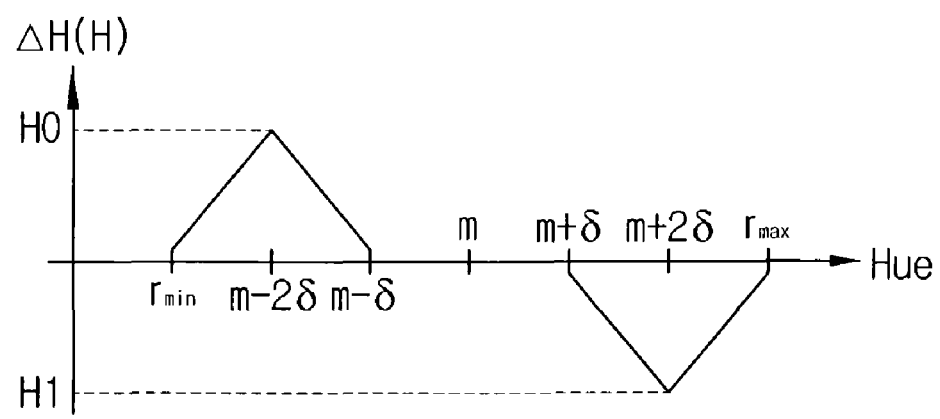
FIG. 6 is a graph showing a color deflection function for calculating color deflection.

FIG. 6 is a graph showing a hue deflection function for calculating a hue deflection. The axis X is the hue value and the axis T is the hue deflection ΔH with respect to each color value. In FIG. 6, m is an average value, $r_{min}$ is a minimum value of skin tone range of a real image, and $r_{max}$ is a maximum value of skin tone range of a real image. When the color value is within the range of m−δ, m+δ, it is the color value of the area of the skin tone preferred by people and there is no need to compensate the color. Accordingly, the hue deflection ΔH is zero.

When the hue value is less than m−δ, it is the value that grows distant from the area of the skin tone preferred by people. Thus, the hue deflection ΔH should be increased. A maximum value of the hue deflection ΔH is H0, and this value is selected from values between δ and 2δ. Conversely, when the hue value is less than m−2δ, the hue deflection ΔH is reduced. As described, the hue deflection ΔH is reduced because the color value that is less than m−2δ and is very likely not to be a skin tone. In other words, the compensation is performed within the range of color that is assumed as the skin tone.

When the hue value is greater than m+2δ is the same as above. Yet, the color deflection ΔH is a negative (−) value to reduce the hue value in this case. H1, the minimum value of the color deflection ΔH, is selected from the range between −2δ and −δ.

A hue deflection function for calculating the hue deflection based on an input hue signal can be obtained using the above method, and the chroma deflection and the luminance deflection are calculated applying the same method.

Referring back to the flow chart in FIGS. 2 and 3, the skin tone mapping function generation unit 140 compensates the original chroma signal, the hue signal and the luminance signal by using the chroma deflection, the hue deflection and the luminance deflection calculated from the chroma deflection function generation unit 110, hue deflection function generation unit 120 and luminance deflection function generation unit 130 (S220). The method of compensation used by the skin tone mapping function generation unit 140 is to sum the calculated chroma deflection with the original chroma signal, the calculated hue deflection with the original hue signal, and the calculated luminance signal with the original luminance signal. This can be expressed as the following mathematical expression.

Mathematical Expression 2

$$(Y,C,H)_{out} = (Y+\Delta Y(Y), C+\Delta C(C), H+\Delta H(H))$$

As described so far, a distorted color can be compensated by compensating the chroma signal, the hue signal and the luminance signal existed around a certain area like the skin tone based on a calculated chroma deflection, hue deflection and luminance deflection.

The case of the skin tone compensation has been described in the preferred embodiment of the present invention. Yet, the method of calculating color data preferred by people can be used with respect to any color, and after that calculating chroma deflection, hue deflection and luminance deflection are based on the color data. Moreover, while color properties of chroma, hue, and luminance are discussed by way of example, it is understood that additional properties can be similarly compensated in a multidimensional color space.

According to the present invention, when a color that is sensitive to the eyes of people in an input image is so distorted as to be unsuitable for photographing because of a transmission flaw or various external lights, the distorted color can be compensated to one preferred by people.

While not required in all aspects, it is understood that the method of the present invention can be implemented using computer software, including firmware, readable by a computer.

Although various embodiments and aspects of the present invention have been described, it will be understood by those skilled in the art that the present invention should not be limited to the described embodiments, but various exchanges and modifications can be made within the spirit and the scope of the present invention. Accordingly, the scope of the present invention is not limited within the described range but is instead defined by the following claims and the equivalents thereof.

What is claimed is:

1. An apparatus for color compensation of an input signal comprising:

a chroma deflection generation unit to calculate a chroma deflection based on an input chroma signal detected from the input signal and a predetermined first reference value;

a hue deflection generation unit to calculate a hue deflection based on an input hue signal detected from the input signal and a predetermined second reference value;

a luminance deflection generation unit to calculate a luminance deflection based on an input luminance signal detected from the input signal and a predetermined third reference value;

a skin tone mapping function generation unit to output a compensated chroma signal, a compensated hue signal and a compensated luminance signal after individually compensating the input chroma, hue, and luminance signals based on the chroma deflection, the hue deflection and the luminance deflection; and a color space conversion unit to respectively calculate the input chroma signal, the hue signal and the luminance signal by converting a color signal of the input signal in a color space, and transmit the chroma, hue, and luminance signals to the corresponding chroma deflection function generation unit, hue deflection function generation unit and luminance deflection function unit.

2. The apparatus for color compensation of claim 1, wherein the first, second, and third reference values are provided based on empirical data collected after statistically processing data obtained through experiment.

3. The apparatus for color compensation of claim 2, wherein the chroma deflection is calculated based on a difference between the input chroma signal and the first reference value.

4. The apparatus for color compensation of claim 3, wherein the skin tone mapping function unit outputs the compensated chroma signal compensated after summing the input chroma signal and the chroma deflection.

5. The apparatus for color compensation of claim 2, wherein the hue deflection is calculated based on a difference between the input hue signal and the second reference value.

6. The apparatus for color compensation of claim 5, wherein the skin tone mapping function unit outputs the compensated chroma signal compensated after summing the input hue signal and the hue deflection.

7. The apparatus for color compensation of claim 2, wherein the luminance deflection is calculated based on a difference between the input luminance signal and the third reference value.

8. The apparatus for color compensation of claim 7, wherein the skin tone mapping function unit outputs the compensated luminance signal compensated after summing the input luminance signal and the luminance deflection.

9. A method of color compensation of an input signal comprising:
 calculating a chroma deflection based on an input chroma signal detected from the input signal and a predetermined first reference value;
 calculating a hue deflection based on an input hue signal detected from the input signal and a predetermined second reference value;
 calculating a luminance deflection based on an input luminance signal and a predetermined third reference value;
 outputting the compensated chroma, hue and luminance signals after individually compensating the input chroma, hue, and luminance signals based on the calculated chroma deflection, hue deflection, and luminance deflection;
 calculating the input chroma signal, the hue signal and the luminance signal by converting a color signal of the input signal in a color space; and
 individually transmitting the calculated chroma, hue, and luminance signals as the input chroma, hue, and luminance signals for use in the calculating the chroma deflection, the hue deflection, and the luminance deflection.

10. The method of color compensation of claim 9, wherein the first, second and third reference values are provided based on empirical data collected after statistically processing data obtained through experiment.

11. The method of color compensation of claim 10, wherein the chroma deflection is calculated based on a difference between the input chroma signal and the first reference value.

12. The method of color compensation of claim 11, wherein the outputting the compensated chroma, hue, and luminance signals comprises summing the input chroma signal and the chroma deflection.

13. The method of color compensation of claim 10, wherein the hue deflection is calculated based on a difference between the input hue signal and the second reference value.

14. The method of color compensation of claim 13, the outputting the compensated chroma, hue, and luminance signals comprises summing the input hue signal and the hue deflection.

15. The method of color compensation of claim 10, wherein the luminance deflection is calculated based on a difference between the input luminance signal and the third reference value.

16. The method of color compensation of claim 15, the outputting the compensated chroma, hue, and luminance signals comprises summing the luminance signal and the luminance deflection.

17. An apparatus for color compensating an input image having image properties, comprising:
 a first deflection calculation unit to detect a first amount of deflection of a first one of the image properties from a first reference value;
 a second deflection calculation unit to detect a second amount of deflection of a second one of the image properties from a second reference value; and
 a compensation unit which compensates the first and second image properties of the input image using the first and second amounts of deflection so as to output a compensated image,
 wherein
  the first deflection calculation unit compares the first image property to first through third ranges to determine the first amount of deflection,
  the first range including the first reference value and for which the first amount of deflection is zero,
  the second range being disposed outside of the first range and for which the first amount of deflection is non-zero, and
  a third range being disposed outside of the first and second ranges and for which the first amount of deflection is zero.

18. The apparatus of claim 17, further comprising a third deflection calculation unit to detect a third amount of deflection of a third one of the image properties from a third reference value, wherein the compensation unit compensates the first, second, and third image properties of the input image using the first, second, and third amounts of deflection so as to output the compensated image.

19. The apparatus of claim 17, wherein one of the first and second image properties is luminance, and the other one of the first and second image properties is chroma.

20. The apparatus of claim 18, wherein one of the first through third image properties is luminance, another one of the first through third image properties is chroma, and a remaining one of the first through third image properties is hue.

21. The apparatus of claim 17, further comprising a color space conversion unit to convert the input image into the first and second properties for use by the first and second deflection calculation units.

22. The apparatus of claim 21, wherein the color space conversion unit converts the input image to be mapped into first and second properties in a color space comprising one of RGB, YIQ, YUV, YCbCr and HLS.

23. The apparatus of claim 18, further comprising a color space conversion unit to convert the input image into the first through third properties for use by the first through third deflection calculation units.

24. The apparatus of claim 23, wherein the color space conversion unit converts the input image to the first through third properties mapped in a color space comprising one of RGB, YIQ, YUV, YCbCr and HLS.

25. The apparatus of claim 17, further comprising a display unit to display the compensated image.

26. The apparatus of claim 18, further comprising a display unit to display the compensated image.

27. The apparatus of claim 17, wherein:
the second range includes a midpoint at which the first amount of deflection is at either a maximum or a minimum,
from the midpoint towards the first range, the first amount of deflection either increases or decreases, and
from the midpoint towards the third range, the first amount of deflection increases or decreases in correspondence with whether the first amount of deflection from the midpoint towards the first range increases or decreases.

28. The apparatus of claim 18, wherein:
the first deflection calculation unit compares the first image property to first through third ranges to determine the first amount of deflection,
the first range including the first reference value and for which the first amount of deflection is zero,
the second range being disposed outside of the first range and for which the first amount of deflection is non-zero; and
the third range being disposed outside of the first and second ranges and for which the first amount of deflection is zero,
the second deflection calculation unit compares the second image property to fourth through sixth ranges to determine the second amount of deflection,
the fourth range including the second reference value and for which the second amount of deflection is zero,
the fifth range being disposed outside of the fourth range and for which the second amount of deflection is non-zero; and
the sixth range being disposed outside of the fourth and fifth ranges and for which the second amount of deflection is zero, and
the third deflection calculation unit compares the third image property to seventh through ninth ranges to determine the third amount of deflection,
the seventh range including the third reference value and for which the third amount of deflection is zero,
the eighth range being disposed outside of the seventh range and for which the third amount of deflection is non-zero; and
the ninth range being disposed outside of the seventh and eighth ranges and for which the third amount of deflection is zero.

29. The apparatus of claim 28, wherein:
the second, fifth, and eighth ranges each include a midpoint at which the corresponding one of first, second, and third amounts of deflection is at a maximum or a minimum,
from the respective midpoints towards the corresponding first, fourth, and seventh ranges, the corresponding first, second, and third amounts of deflection either increase or decrease, and
from the respective midpoints towards the corresponding third, sixth, and ninth ranges, the corresponding first, second, and third amounts of deflection either increases or decreases in correspondence with whether the corresponding first, second, and third amounts of deflection from the respective midpoints towards the corresponding first, fourth, and seventh ranges increases or decreases.

30. A computer readable medium encoded with processing instructions for performing a method of color compensating an input image having image properties performed by a computer, the method comprising:
calculating a first amount of deflection of a first one of the image properties from a first reference value;
calculating a second amount of deflection of a second one of the image properties from a second reference value; and
compensating the first and second image properties of the input image using the first and second amounts of deflection so as to output a compensated images,
wherein the calculating the first amount of deflection comprises comparing the first image property to first through third ranges to determine the first amount, the first range including the first reference value and for which the first amount is zero, the second range being disposed outside of the first range and for which the first amount is non-zero, and a third range being disposed outside of the first and second ranges and for which the first amount is zero.

31. The computer readable medium of claim 30, wherein:
the method further comprises calculating a third amount of deflection of a third one of the image properties from a third reference value, and
the compensating to output the compensated image comprises compensating the first, second, and third image properties of the input image using the first, second, and third amounts of deflection so as to output the compensated image.

32. The computer readable medium of claim 30, wherein one of the first and second image properties is luminance, and the other one of the first and second image properties is chroma.

33. The computer readable medium of claim 31, wherein one of the first through third image properties is luminance, another one of the first through third image properties is chroma, and a remaining one of the first through third image properties is hue.

34. The computer readable medium of claim 30, wherein the method further comprises converting the input image into the first and second properties for use in the calculating the first and second amounts of deflection.

35. The computer readable medium of claim 34, wherein the converting the input image comprises converting the input image to the first and second properties mapped into a color space comprising RGB, YIQ, YUV, YCbCr or HLS.

36. The computer readable medium of claim 31, wherein the method further comprises converting the input image into the first through third properties for use in the calculating the first through third amounts.

37. The computer readable medium of claim 36, wherein the converting the input image comprises converting the input image into the first through third properties mapped into a color space comprising RGB, YIQ, YUV, YCbCr or HLS.

38. The computer readable medium of claim 30, wherein the method further comprises outputting the compensated image to a display unit to display the compensated image.

39. The computer readable medium of claim 31, wherein the method further comprises outputting the compensated image to a display unit to display the compensated image.

40. The computer readable medium of claim 30, wherein:
the second range includes a midpoint at which the first amount of deflection is at either a maximum or a minimum, from the midpoint towards the first range, the first amount of deflection either increases or decreases, and from the midpoint towards the third range, the first amount the other either increases or decreases in correspondence with whether the first amount of deflection from the midpoint towards the first range increases or decreases.

41. The computer readable medium of claim 31, wherein:

the calculating the first amount of deflection comprises comparing the first image property to first through third ranges to determine the first amount of deflection, the first range including the first reference value and for which the first amount of deflection is zero, the second range being disposed outside of the first range and for which the first amount of deflection is non-zero; and the third range being disposed outside of the first and second ranges and for which the first amount of deflection is zero, the calculating the second amount of deflection comprises comparing the second image property to fourth through sixth ranges to determine the second amount of deflection, the fourth range including the second reference value and for which the second amount of deflection is zero, the fifth range being disposed outside of the fourth range and for which the second amount of deflection is non-zero; and the sixth range being disposed outside of the fourth and fifth ranges and for which the second amount of deflection is zero, and the calculating the third amount of deflection comprises comparing the third image property to seventh through ninth ranges to determine the third amount of deflection, the seventh range including the third reference value and for which the third amount of deflection is zero, the eighth range being disposed outside of the seventh range and for which the third amount of deflection is non-zero; and the ninth range being disposed outside of the seventh and eighth ranges and for which the third amount of deflection is zero.

42. The computer readable medium of claim 41, wherein:

the second, fifth, and eighth ranges each include a midpoint at which the corresponding one of first, second, and third amounts of deflection is at either a maximum or a minimum, from the respective midpoints towards the corresponding first, fourth, and seventh ranges, the corresponding first, second, and third amounts of deflection either increase or decrease, and from the respective midpoints towards the corresponding third, sixth, and ninth ranges, the corresponding first, second, and third amounts of deflection either increase or decrease in correspondence with whether the corresponding first, second, and third amounts of deflection from the respective midpoints towards the corresponding first, fourth, and seventh ranges increases or decreases.

* * * * *

UNITED STATES PATENT AND TRADEMARK OFFICE
CERTIFICATE OF CORRECTION

| | | |
|---|---|---|
| PATENT NO. | : 7,348,992 B2 | Page 1 of 1 |
| APPLICATION NO. | : 10/622647 | |
| DATED | : March 25, 2008 | |
| INVENTOR(S) | : Moon-cheol Kim et al. | |

It is certified that error appears in the above-identified patent and that said Letters Patent is hereby corrected as shown below:

Column 10, Line 12, change "images," to --image,--.

Signed and Sealed this

Twenty-sixth Day of August, 2008

JON W. DUDAS
*Director of the United States Patent and Trademark Office*